(12) United States Patent
Frantz

(10) Patent No.: US 8,481,463 B2
(45) Date of Patent: Jul. 9, 2013

(54) OIL-BASED GROUTING COMPOSITION WITH AN INSULATING MATERIAL

(75) Inventor: Eric B. Frantz, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/531,210

(22) Filed: Jun. 22, 2012

(65) Prior Publication Data

US 2012/0260826 A1 Oct. 18, 2012

Related U.S. Application Data

(62) Division of application No. 12/814,607, filed on Jun. 14, 2010, now Pat. No. 8,322,423.

(51) Int. Cl.
*C04B 38/08* (2006.01)
*C04B 18/06* (2006.01)
*C04B 14/24* (2006.01)
*E21B 33/13* (2006.01)
*E21B 36/00* (2006.01)

(52) U.S. Cl.
USPC .......... 507/269; 507/248; 507/260; 507/261; 507/263; 507/265; 507/266; 507/267; 166/292; 166/302; 106/662

(58) Field of Classification Search
None
See application file for complete search history.

(56) References Cited

U.S. PATENT DOCUMENTS 3,827,978 A * 8/1974 Miles ........................... 507/203
3,831,678 A * 8/1974 Mondshine .................. 166/288

* cited by examiner

*Primary Examiner* — John J Figueroa
(74) *Attorney, Agent, or Firm* — Craig W. Roddy; Booth Albanesi Schroeder LLC

(57) ABSTRACT

A grouting composition for use in insulating a portion of a tubular located inside an enclosed conduit comprises: (A) an oil-swellable binding material comprising a organophilic clay; and (B) a hydrocarbon liquid, wherein the hydrocarbon liquid is the continuous phase of the grouting composition; and (C) an insulating material comprising a hollow microsphere, wherein after the grouting composition has set, the grouting composition has a thermal conductivity of less than 0.3 BTU/hr·ft·° F.

19 Claims, No Drawings

OIL-BASED GROUTING COMPOSITION WITH AN INSULATING MATERIAL

FIELD OF THE INVENTION

The invention is directed to an oil-based grouting composition and a method for thermally insulating a portion of a tubular located inside an enclosed conduit using the grouting composition.

SUMMARY

According to an embodiment, a method for thermally insulating a portion of a tubular located inside an enclosed conduit comprises the steps of: (A) introducing a grouting composition into an annulus between the tubular and the enclosed conduit, the grouting composition comprising: (i) an oil-swellable binding material comprising an organophilic clay; and (ii) a hydrocarbon liquid, wherein the hydrocarbon liquid is the continuous phase of the grouting composition; and (iii) an insulating material comprising a hollow microsphere; and (B) allowing or causing the grouting composition to set after the step of introducing, wherein after setting the grouting composition has a thermal conductivity of less than 0.3 BTU/hr·ft·° F.

According to another embodiment, a grouting composition for use in insulating a portion of a tubular located inside an enclosed conduit comprises: (A) an oil-swellable binding material comprising an organophilic clay; (B) a hydrocarbon liquid, wherein the hydrocarbon liquid is the continuous phase of the grouting composition; and (C) an insulating material comprising a hollow microsphere, wherein after the grouting composition has set, the grouting composition has a thermal conductivity of less than 0.3 BTU/hr·ft·° F.

DETAILED DESCRIPTION OF THE INVENTION

As used herein, the words "comprise," "have," "include," and all grammatical variations thereof are each intended to have an open, non-limiting meaning that does not exclude additional elements or steps.

As used herein, a "fluid" is a substance having a continuous phase and that tends to flow and to conform to the outline of its container when the substance is tested at a temperature of 71° F. and a pressure of 1 atmosphere. An example of a fluid is a liquid or gas. A heterogeneous fluid has an external phase and at least one internal phase. By contrast, a homogenous fluid does not have distinct phases. Examples of a heterogeneous fluid include a slurry, which is a suspension of solid particles in a continuous liquid phase; an emulsion, which is a suspension of two or more immiscible liquids where droplets of at least one liquid phase are dispersed in a continuous liquid phase of another; and a foam, which is a suspension or dispersion of gas bubbles in a continuous liquid phase. As used herein, the term "oil-based" means a heterogeneous fluid in which the continuous liquid phase is a hydrocarbon liquid.

As used herein, the verb "grout" and all grammatical variations means filling a void with a substance that sets. As used herein, a "grouting composition" is a mixture of at least a binding material and a liquid (and possibly other additives) that is used to grout. As used herein, the term "binding material" means a dry powder substance that acts as a binder to bind other materials together.

As used herein, a "well" includes at least one wellbore drilled into a subterranean formation, which may be a reservoir or an aquifer, or adjacent to a reservoir or aquifer. A wellbore can have vertical and horizontal portions, and it can be straight, curved, or branched. As used herein, the term "wellbore" refers to a wellbore itself, including any uncased, open-hole portion of the wellbore. A near-wellbore region is the subterranean material and rock of the subterranean formation surrounding the wellbore. As used herein, a "well" also includes the near-wellbore region. The near-wellbore region is considered to be the region within about 100 feet of the wellbore. As used herein, "into a well" means and includes into any portion of the well, including into the wellbore or into the near-wellbore region via the wellbore.

Oil and gas hydrocarbons, as well as water, are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). A subterranean formation that contains water is referred to as an aquifer.

In order to produce hydrocarbons or water, a wellbore is drilled into or near a reservoir or aquifer. A well that is drilled into a reservoir is generally called an oil or gas well; whereas a well that is drilled into an aquifer is generally called a water well. The wellbore may be an open hole or cased hole. In an open-hole wellbore, a tubular called a tubing string is placed into the wellbore. The tubing string allows fluids to be introduced into or flowed from a remote portion of the wellbore. In a cased hole, another tubular called a casing is placed into the wellbore that can contain a tubing string. As used herein, the word "tubular" means any kind of pipe. Examples of tubulars include, but are not limited to, a tubing string, a casing, a drill pipe, a line pipe, and a transportation pipe. Tubulars can also be used to transport fluids into or out of a subterranean formation, such as oil, gas, water, liquefied methane, coolants, and heated fluids. For example, a tubular can be placed underground to transport produced hydrocarbons or water from a subterranean formation to another location.

As used herein, the term "annulus" means the space between two generally cylindrical objects, one inside the other, where fluid can flow. The objects can be concentric or eccentric. One of the objects can be a tubular and the other object can be an enclosed conduit. The enclosed conduit can be a wellbore or borehole or it can be another tubular. The following examples illustrate some situations in which an annulus can exist, but are in no way limiting as to all the situations in which an annulus can exist. Referring to an oil, gas, or water well, in an open hole well, the space between the wellbore and the outside of a tubing string is an annulus. In a cased hole, the space between the wellbore and the outside of the casing is an annulus. Also, in a cased hole, there may be an annulus between the tubing string and the inside of the casing. Referring to transportation pipelines, an annulus can exist between the outside of the tubular and the borehole underground in which the tubular is placed. In an off shore environment, a transportation tubular can be located inside another tubular. The space between the outside of the transportation tubular and the inside of the other tubular is an annulus.

It is common to introduce a grouting composition into an annulus. For example, in a cased hole, the grouting composition can be placed and allowed to set in the annulus between the wellbore and the casing in order to create a seal in the annulus. By sealing the casing in the wellbore, fluids are prevented from flowing into the annulus. Consequently, hydrocarbons or water can be produced in a controlled manner by directing the flow of hydrocarbons or water through the casing and into the wellhead. By way of another example, a grouting composition can be placed in the annulus between a casing and a tubing string. Grouting compositions can also be used as an isolating fluid to isolate one portion of an annulus from another portion of the annulus.

During grouting operations, it is necessary for the grouting composition to remain pumpable during introduction into the annulus and until the composition is situated in the annulus. After the grouting composition has reached the portion of the annulus to be grouted, the grouting composition ultimately sets. A grouting composition that thickens too quickly while being pumped can damage pumping equipment or block tubulars and a grouting composition that sets too slowly can cost time and money while waiting for the composition to set.

If any test (e.g., thickening time or shear strength) requires the step of mixing, then the grouting composition is "mixed" according to the following procedure. Any of the ingredients that are a dry substance are pre-blended. The hydrocarbon liquid is added to a mixing container and the container is then placed on a mixer base. For example, the mixer can be a LIGHTNING™ mixer. The motor of the base is then turned on and maintained at about 1,000 revolutions per minute (rpm). If a dispersant is included in the grouting composition, it is added to the hydrocarbon liquid. The binder material and any other ingredients are then added to the container at a uniform rate in not more than 5 minutes (min). After all the binder material and any other ingredients have been added to the base fluid in the container, a cover is then placed on the container, and the grouting composition is mixed at about 1,000 rpm (+/−50 rpm) for 5 min It is to be understood that the grouting composition is mixed at ambient temperature and pressure conditions (71° F. and about 1 atmosphere of pressure). It is also to be understood that if any test (e.g., thickening time and shear strength) specifies the test be performed at a specific temperature and possibly a specific pressure, then the temperature and pressure of the grouting composition is ramped up to the specified temperature and pressure after being mixed at ambient temperature and pressure. For example, the grouting composition can be mixed at 71° F. and then placed into the testing apparatus and the temperature of the grouting composition can be ramped up to the specified temperature. As used herein, the rate of ramping up the temperature is in the range of about 3° F/min to about 5° F/min. After the grouting composition is ramped up to the specified temperature and possibly pressure, the grouting composition is maintained at that temperature and pressure for the duration of the testing.

As used herein, the "thickening time" is how long it takes for a grouting composition to become unpumpable at a specified temperature and specified pressure. The pumpability of a grouting composition is related to the consistency of the composition. The consistency of a grouting composition is measured in Bearden units of consistency (Bc), a dimensionless unit with no direct conversion factor to the more common units of viscosity. As used herein, a grouting composition becomes "unpumpable" when the consistency of the composition reaches 60 Bc. As used herein, the consistency of a grouting composition is measured as follows. The grouting composition is mixed. The grouting composition is then placed in the test cell of an atmospheric consistometer, such as a Model 165AT atmospheric consistometer available from Fann Instrument Company in Houston, Tex. The grouting composition is ramped up to the specified temperature and pressure and is maintained at the specified temperature and pressure. Consistency measurements are taken continuously until the grouting composition exceeds 60 Bc.

A grouting composition can set. The shear strength of a grouting composition can be used to indicate whether the grouting composition has set. It is desirable to have a high shear strength for a grouting composition. Shear strength is the strength of a material or component against the type of yield or structural failure where the material or component shears and can be expressed in units of lb/100 ft$^2$. Shear strength is generally measured at a specified time after the grouting composition has been mixed and the composition is tested at a specified temperature and possibly a specified pressure. For example, shear strength can be measured at a time in the range of about 24 to about 48 hours after the composition is mixed and the composition is tested at a temperature of 71° F. and a pressure of 1 atmosphere. As used herein, the shear strength of a grouting composition is measured as follows in accordance with API RP 13B-1, Appendix B. The grouting composition is mixed and given 24 to 48 hours to develop shear strength. Next, a metal shear tube 3.5 inches (89 mm) in length, with an outside diameter of 1.4 inches (36 mm), and wall thickness of 0.008 inches (0.02 mm) is placed onto the surface of the grouting composition. A platform or "stage" is then placed directly on top of the metal shear tube. Incremental amounts of a known weight are sequentially placed on the platform until the metal shear tube is submerged approximately 2 inches into the surface of the grouting composition. The depth submerged is then accurately measured and recorded along with the combined weight of the platform and the incrementally added weights. When inches, grams, gallons, and pounds are the units employed, the following equation can be utilized to calculate shear strength:

$$S = \frac{3.61\ (Z + W)}{L} - 0.256\ A$$

where S=shear strength in lb/100 ft$^2$, Z=weight of shear tube in grams, W=total shear weight in grams (platform+incrementally added weights), L=submerged depth of shear tube in inches, and A is the grouting composition density in lb/gal. As used herein, a grouting composition is considered "set" if the composition has a shear strength of at least 200 lb/100 ft$^2$ when measured at 24 hours at a temperature of 71° F. and a pressure of 1 atmosphere.

Tubulars can be made of copper, iron, aluminum, various grades of steel, various plastics such as PVC and HDPE, cement composites and concrete. Metals are generally thermally conductive. Thermal conductivity refers to the ability of a material to conduct heat. The thermal conductivity for a material, such as a metal, can be calculated as follows:

$$k=(\Delta Q/A\Delta t)*(x/\Delta T)$$

where $\Delta Q$=quantity of heat; $\Delta t$=time; x=thickness of the material; A=surface area of the material; and $\Delta T$=temperature difference. Thermal conductivity can be expressed in English units of BTU/hr·ft·° F. Some metals conduct more heat compared to other metals. For example, the thermal conductivity of copper is 229 BTU/hr·ft·° F., whereas, the thermal conductivity of iron is 46 BTU/hr·ft·° F.

As used herein, the thermal conductivity of a grouting composition is measured by utilizing a variation of the heat line source test method using a KD2 Pro meter from Decagon Devices with a needle probe having a large length to diameter ratio. The probe consists of a heating element and a temperature measuring element and is inserted into the specimen. A known current and voltage are applied to the probe and the temperature rise with time is recorded over a period of time. The thermal conductivity of a grouting composition is measured as follows. The grouting composition is mixed. The grouting composition is then placed in a 120° F. water bath until the grouting composition is set. The grouting composition is removed from the water bath and allowed to come to equilibrium at 71° F. and a pressure of 1 atm. The probe of the KD2 Pro is then completely submerged into the surface of the material and allowed to equilibrate for 15 minutes. The device is set to measure thermal conductivity in BTU/hr·ft·° F. Data is deemed acceptable for $r^2$ correlations of 0.9990 or greater.

Heat flows from an area of higher temperature to an adjacent area of lower temperature. For example, if the temperature of a surrounding enclosed conduit is higher than the temperature of a fluid located in a tubular, then the temperature of the fluid can be increased via the tubular transferring heat from the enclosed conduit to the fluid. By way of another example, if the temperature of an enclosed conduit is lower than the temperature of a fluid located in a tubular, then the temperature of the fluid can be decreased via the tubular transferring heat from the fluid to the enclosed conduit. The greater the thermal conductivity of a material, the more heat can be transferred through the material from an area of higher temperature to an area of lower temperature. An insulating material should have a much lower thermal conductivity compared to the surrounding formation or compared to a grouting composition with a thermal conductivity of greater than 0.3 BTU/hr·ft·° F. Therefore, it is often desirable to insulate a tubular in order to inhibit the tubular from transferring heat to or from the fluid.

Foams have been used to insulate a portion of a tubular located in an enclosed conduit. However, foams can be dangerous to work with due to the great expansive properties of the foam. Foams can also require specialized equipment to store the foam components and pump the foam into an annulus. Foams can also be affixed to a tubular before the tubular is placed in an enclosed conduit. However, this approach is costly, time-consuming, and it is often difficult to place the pre-insulated tubular in the enclosed conduit. Also, due to the curing times of foams, there is a limit to the length of tubular that can be insulated in a given amount of time. Therefore, there is a need for an insulating composition that is not a foam to be used for insulating a portion of a tubular located in an enclosed conduit.

It has been discovered that an oil-based grouting composition containing hollow microspheres can be used to insulate at least a portion of a tubular that is located in an enclosed conduit.

According to an embodiment, a method for thermally insulating a portion of a tubular located inside an enclosed conduit comprises the steps of: (A) introducing a grouting composition into an annulus between the tubular and the enclosed conduit, the grouting composition comprising: (i) an oil-swellable binding material comprising an organophilic clay; and (ii) a hydrocarbon liquid, wherein the hydrocarbon liquid is the continuous phase of the grouting composition; and (iii) an insulating material comprising a hollow microsphere; and (B) allowing or causing the grouting composition to set after the step of introducing, wherein after setting the grouting composition has a thermal conductivity of less than 0.3 BTU/hr·ft·° F.

According to another embodiment, a grouting composition for use in insulating a portion of a tubular located inside an enclosed conduit comprises: (A) an oil-swellable binding material comprising an organophilic clay; and (B) a hydrocarbon liquid, wherein the hydrocarbon liquid is the continuous phase of the grouting composition; and (C) an insulating material comprising a hollow microsphere, wherein after the grouting composition has set, the grouting composition has a thermal conductivity of less than 0.3 BTU/hr·ft·° F.

The discussion of preferred embodiments regarding the grouting composition, or any ingredient in the grouting composition, is intended to apply to the methods of the invention and the compositions of the invention. Any reference to the unit "gallons" means U.S. gallons.

The grouting composition includes an oil-swellable binding material. As used herein, the term "oil-swellable" means that the binding material is able to incorporate a compatible hydrocarbon liquid into the microstructure of the binding material. Compatible means that the hydrocarbon liquid is selected based on the specific type of binding material used such that the binding material is able to incorporate the hydrocarbon liquid into the microstructure of the specific binding material. As used herein, the oil-swellable binding material is capable of binding ingredients together is suitable for use in an oil-based grouting composition. Preferably, the binding material is oil insoluble. As used herein, the term "oil insoluble" means that less than 1 part of the binding material dissolves in 1000 parts of the hydrocarbon liquid. According to the invention, the binding material comprises an organophilic clay. As used herein, an "organophilic clay" is a clay possessing a cationic exchange capacity that has been coated with a fatty-acid quaternary amine to make the clay oil swellable. Examples of suitable clays are bentonite, hectorite, attapulgite, and sepiolite. Preferably, the clay is bentonite. A commercially available example of an organophilic clay is GELTONE V®, available from Halliburton Energy Services, Inc. in Duncan, Okla. Preferably, the binding material is in a concentration of at least 75 pounds per 100 gallons of the hydrocarbon liquid. The binding material can be in a concentration in the range of about 75 to about 500 pounds per 100 gallons of the hydrocarbon liquid. More preferably, the binding material is in a concentration in the range of about 125 to about 400 pounds per 100 gallons of the hydrocarbon liquid.

The grouting composition includes a hydrocarbon liquid, wherein the hydrocarbon liquid is the continuous phase of the grouting composition. Preferably, the hydrocarbon liquid has a carbon length in the range of C8-C40. More preferably, the refined hydrocarbon liquid has a carbon length in the range of C10-C20. Preferably, the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a suitable fractional distillate of crude oil is diesel oil. A commercially-available example of a fatty acid ester is PETROFREE® ESTER base fluid, available from Halliburton Energy Services, Inc. in Houston, Tex. The saturated hydrocarbon can be an alkane or paraffin. Preferably, the saturated hydrocarbon is a paraffin. The paraffin can be an isoalkane (isoparaffin), a linear alkane (paraffin), or a cyclic alkane (cycloparaffin). An example of an alkane is BAROID ALKANE™ base fluid, available from Halliburton Energy Services, Inc. in Houston, Tex. Examples of suitable paraffins include, but are not limited to: BIO-BASE 360® (an isoalkane and n-alkane); BIO-BASE 300™ (a linear alkane); BIO-BASE 560® (a blend containing greater than 90% linear alkanes); and ESCAID 110™ (a mineral oil blend of mainly alkanes and cyclic alkanes). The BIO-BASE liquids are available from Shrieve Chemical Products, Inc. in The Woodlands, Tex. The ESCAID liquid is available from ExxonMobil in Houston, Tex. The unsaturated hydrocarbon can be an alkene, alkyne, or aromatic. Preferably, the unsaturated hydrocarbon is an alkene. The alkene can be an isoalkene, linear alkene, or cyclic alkene. The linear alkene can be a linear alpha olefin or an internal olefin. An example of a linear alpha olefin is NOVATEC™, available from M-I SWACO in Houston, Tex. Examples of internal olefins include, ENCORE® drilling fluid and ACCOLADE® drilling fluid, available from Halliburton Energy Services, Inc. in Houston, Tex.

Preferably, the grouting composition is a slurry in which the hydrocarbon liquid is the continuous liquid phase and includes undissolved solids. The grouting composition can also be an emulsion in which the hydrocarbon liquid is the continuous liquid phase. There can be undissolved solids in the continuous phase. The grouting composition can further include a surfactant. Also, if the grouting composition is an emulsion, then an aqueous liquid is the dispersed phase. Preferably, the aqueous liquid is in a concentration of less than 10% by volume of the continuous phase. Preferably, the grouting composition is not a foam.

The grouting composition can further include an insulating material. As used herein, the term "insulating material" means a material that has a thermal conductivity of less than 0.2 BTU/hr·ft·° F. In addition, as used herein, the insulating material is oil insoluble. According to this invention, the insulating material comprises a hollow microsphere. The hollow microsphere can be made from a mixture of fly ash and crystalline silica, a mixture of soda lime borosilicate glass and silica gel, or a polymer. More than one type of hollow microsphere can be used. A commercially-available example of the hollow microsphere made from a mixture of fly ash and crystalline silica is SPHERELITE® additive, available from Halliburton Energy Services, Inc. in Duncan, Okla. Commercially-available examples of a hollow microsphere made from a mixture of soda lime borosilicate glass and silica gel include HGS2000™, HG53000™, HGS4000™, HGS5000™, HGS6000™, HGS10000™, and HGS18000™ glass bubbles, available from 3M in St. Paul, Minn., in any combination thereof. Preferably, the insulating material has a particle size distribution such that at least 90% of the insulating material has a particle size of less than 10 mesh. More preferably, the insulating material has a particle size distribution such that at least 90% of the insulating material has a particle size in the range of about 10 to about 325 mesh.

Preferably, the insulating material is in at least a sufficient concentration such that the grouting composition has a thermal conductivity of less than 0.3 BTU/hr·ft·° F. More preferably, the insulating material is in at least a sufficient concentration such that the grouting composition has a thermal conductivity of less than 0.2 BTU/hr·ft·° F. Most preferably, the insulating material is in at least a sufficient concentration such that the grouting composition has a thermal conductivity of less than 0.15 BTU/hr·ft·° F. Preferably, the insulating material is in a concentration of at least 50 pounds per 100 gallons of hydrocarbon liquid. More preferably, the insulating material is in a concentration in the range of about 50 to about 600 pounds per 100 gallons of hydrocarbon liquid. Most preferably, the insulating material is in a concentration in the range of about 100 to about 500 pounds per 100 gallons of hydrocarbon liquid.

Preferably, the grouting composition has a thickening time of at least 10 minutes at a temperature of 80° F. and a pressure of 1 atmosphere (atm). It is preferred that the grouting composition has a thickening time of at least 5 minutes at a temperature of 90° F. and a pressure of 1 atm. More preferably, the grouting composition has a thickening time in the range of about 5 to about 20 minutes at a temperature of 90° F. and a pressure of 1 atm.

Preferably, the grouting composition has a shear strength of at least 200 lb/100 ft$^2$ when tested at 24 hours at a temperature of 71° F. and a pressure of 1 atm. More preferably, the grouting composition has a shear strength in the range of about 500 to about 40,000 lb/100 ft$^2$ when tested at 24 hours at a temperature of 71° F. and a pressure of 1 atm. Most preferably, the grouting composition has a shear strength in the range of about 500 to about 10,000 lb/100 ft$^2$ when tested at 24 hours at a temperature of 71° F. and a pressure of 1 atm.

After setting, the grouting composition has a thermal conductivity of less than 0.3 BTU/hr·ft·° F. Preferably, the grouting composition has a thermal conductivity of less than 0.2 BTU/hr·ft·° F. More preferably, the grouting composition has a thermal conductivity of less than 0.15 BTU/hr·ft·° F.

Preferably, the grouting composition has a density of at least 5 pounds per gallon (ppg). More preferably, the grouting composition has a density in the range of about 5 to about 25 ppg. Most preferably, the grouting composition has a density in the range of about 8 to about 12 ppg.

The grouting composition can include at least one additive suitable for use in subterranean grouting operations. Examples of such additives include, but are not limited to, cement, a high-density additive, a dispersant, a filler, a strength-retrogression additive, a set accelerator, a set retarder, a mechanical-property enhancing additive, a lost-circulation material, a filtration-control additive, a fluid loss control additive, a defoaming agent, a thixotropic additive, a nano-particles, and any combination thereof.

The grouting composition can include cement. As used herein, the term "cement" means a dry powder substance that acts to bind materials together upon mixing with water and becomes hard or solid by curing after mixing with the water. Preferably, if the grouting composition includes cement, then the grouting composition is an emulsion which includes an aqueous liquid as the dispersed phase. Preferably, the cement is Class A cement, Class C cement, Class G cement, or Class H cement. Preferably, the cement is in a concentration in the range of about 100 pounds to about 500 pounds per 100 gallons of the hydrocarbon liquid.

The grouting composition can include a high-density additive. In many applications, the composition preferably includes a high-density additive. Preferably, the high-density additive is selected from the group consisting of barite, calcium carbonate, various iron oxides, and any combination thereof. A commercially-available example of barite is BAROID™, available from Halliburton Energy Services, Inc. in Duncan, Okla. Preferably, the high-density additive is in a concentration in the range of about 200 to about 950 pounds per 100 gallons of the hydrocarbon liquid.

By way of another example, the grouting composition can include a dispersant. The dispersant can be a surfactant. The dispersant can be selected from the group consisting of sulfonates, sulfinates, amines, amides, imides, acids, esters, and fatty organic compounds containing either monovalent or divalent cations, in any combination thereof. Suitable examples of dispersants include OMC®2 and OMC®42 oil mud conditioners, CFR®2 dispersant, CFR®3 dispersant, CFR®5LE dispersant, CFR®6 dispersant, CFR®8 dispersant, FDP-C701 additive, FDP-C-850 additive, INVERMUL® NT emulsifier, EZ MUL® emulsifier, COLDTROL® thinner, ATC® thinner, and FACTANT® emulsifier, available from Halliburton Energy Services, Inc. in Duncan, Okla. and Houston, Tex. Preferably, the dispersant is in a concentration in the range of about 0.5 to about 2 pounds per 100 gallons of the hydrocarbon liquid.

The grouting composition can include a filler material. An example of a filler material includes, but is not limited to, diatomaceous earth. Preferably, the filler material is in a concentration in the range of about 50 to about 200 pounds per 100 gallons of the hydrocarbon liquid. A filler material can also increase the shear strength of a grouting composition.

The method includes the step of introducing the grouting composition into an annulus between the tubular and the enclosed conduit. The annulus can be located under land or offshore. The annulus can be part of a transportation pipeline or part of a well. Preferably, the annulus is located at a depth of less than 1,000 feet under land or the sea floor. If the annulus is located in a well, then the well can be an oil, gas, water, or injection well. The step of introducing can be for any purpose where insulating a tubular would be beneficial.

The grouting composition is in a pumpable state upon introduction into the annulus. The method includes the step of allowing or causing the grouting composition to set after the step of introducing. The grouting composition sets via heat. If the annulus containing the portion of tubular to be insulated is above 100° F., then it is believed that the grouting composition will set without the need to supply additional heat. In this situation, the method includes the step of allowing the composition to set. However, if the annulus containing the portion of tubular to be insulated is below 100° F., then additional heat may need to be supplied in order for the grouting composition to set. In this situation, the step of causing the composition to set can further include the step of introducing heat into the tubular after the step of introducing. For example, a liquid with a temperature above 100° F. can be introduced into the tubular after the step of introducing the grouting composition. Of course, a specific grouting composition can be tested prior to the step of introducing in order to determine the specific temperature required to cause the grouting composition to set. For example, laboratory tests can be performed and then compared to the actual temperature of the annulus between the tubular to be insulated and the enclosed conduit. One will then be able to determine if the step is allowing the grouting composition to set or whether the step is causing the grouting composition to set.

The method can further include the step of mixing the grouting composition prior to the step of introducing. It is to be understood that the step of mixing the grouting composition prior to the step of introducing is not the same as the step of mixing a grouting composition for testing purposes (e.g., for testing thickening time or shear strength). One of skill in the art will be able to select the best mixing method based on, inter alia, the specific equipment available at the site of introduction. Preferably, the step of mixing is performed in less than 10 minutes prior to the step of introducing. If the temperature of the mixing site is above 90° F., then preferably, the method further includes the step of reducing the temperature of the mixing site. For example, if during the daytime, the mixing site has a temperature above 90° F. then the step of mixing can be performed at night where the temperature of the mixing site is likely to be less than 90° F. By way of another example, the equipment used to mix the grouting composition can be cooled, such as, by use of an air conditioner. Alternatively, if the temperature of the mixing site is above 90° F., then the total amount of solids in the grouting composition can be reduced, which without being limited by theory, can increase the thickening time of the grouting composition.

Preferably, the grouting composition has a thickening time of at least 10 minutes at the temperature and pressure of the annulus. More preferably, the grouting composition has a thickening time in the range of about 10 to about 100 minutes at the temperature and pressure of the annulus. Preferably, the grouting composition sets in less than 48 hours after the step of introducing at the temperature and pressure of the annulus. More preferably, the grouting composition sets in less than 24 hours after the step of introducing at the temperature and pressure of the annulus. Most preferably, the grouting composition sets at a time in the range of about 8 to about 24 hours after the step of introducing at the temperature and pressure of the annulus. Preferably, the grouting composition is introduced into a high-temperature annulus (i.e., an annulus having a temperature in the range of about 100° F. to about 350° F.). Most preferably, the grouting composition is introduced into a low-temperature annulus (i.e., an annulus having a temperature in the range of about 10° F. to about 100° F.).

EXAMPLES

To facilitate a better understanding of the present invention, the following examples of certain embodiments are given. The following examples are not the only examples that could be given according to the present invention and are not intended to limit the scope of the invention.

Tables 1, 2, and 3 list the ingredients, concentration of the ingredients in pounds per 100 gallons of the base fluid, shear strength, thermal conductivity, and possibly thickening time for various grouting compositions.

Table 1 contains data for different grouting compositions that do not include an insulating material. In Table 1: composition 1 is a water control; composition 2 is a hydrocarbon liquid control containing PETROFREE® ESTER base fluid (PFE) and a binding material; compositions 3 and 4 include a filler material (Diatomaceous Earth); and composition 5 includes a high-density additive (BAROID® weighting agent). As can be seen in Table 1, the hydrocarbon liquid control (composition 2) has a much lower thermal conductivity compared to the water control (composition 1). Compositions 3 and 4 have a decreased concentration of the binding material and include a filler material. As can be seen, compositions 3 and 4 have similar thermal conductivities compared to the oil control. However, the shear strength of compositions 3 and 4 is substantially lower than that of the hydrocarbon liquid control.

TABLE 1

|  | 1 | 2 | 3 | 4 | 5 |
| --- | --- | --- | --- | --- | --- |
| Base Fluid | Deionized Water | PFE | PFE | PFE | PFE |
| OMC 2 (gal/100 gal) | 0 | 0.75 | 0.75 | 0.75 | 0.75 |
| Binding Material | IDP-334 | GELTONE V | GELTONE V | GELTONE V | GELTONE V |
| (lb/100 gal) | 208 | 596 | 289 | 445 | 289 |
| Diatomaceous Earth (lb/100 gal) | 0 | 0 | 98 | 150 | 98 |
| BAROID (lb/100 gal) | 0 | 0 | 0 | 0 | 833 |
| Density (lb/gal) | 9.5 | 9.07 | 8.68 | 9.26 | 23.7 |
| Thickening Time @ 80° F. (mins) | — | — | — | — | — |

TABLE 1-continued

|  | 1 | 2 | 3 | 4 | 5 |
|---|---|---|---|---|---|
| Thickening Time @ 90° F. (mins) | 3.5 | — | — | — | — |
| Shear Strength (lb/100 ft$^2$) | 2,800 | 34,000 | 3,200 | 9,400 | 5,800 |
| Thermal Conductivity (BTU/hr · ft · ° F.) | 0.380 | 0.162 | 0.136 | 0.154 | 0.167 |

Table 2 contains data for various grouting compositions containing different insulating materials. In Table 2: compositions 1 and 2 include SPHERELITE® additive in varying concentrations; and composition 3 includes HGS4000™ additive. As can be seen in Table 2, for compositions 1 and 2, as the concentration of SPHERELITE® additive increases the thermal conductivity of the grouting composition decreases and the shear strength increases. The HGS4000™ additive provided a much lower thermal conductivity; however, it also provided a lower density and lower shear strength.

TABLE 2

|  | 1 | 2 | 3 |
|---|---|---|---|
| Base Fluid | PFE | PFE | PFE |
| OMC 2 (gal/100 gal) | 0.75 | 0.75 | 0.75 |
| GELTONE V (lb/100 gal) | 289 | 289 | 130 |
| Diatomaceous Earth (lb/100 gal) | 98 | 98 | 43 |
| Insulating Material (lb/100 gal) | SPHERELITE 312 | SPHERELITE 546 | HGS4000 270 |
| Density (lb/gal) | 8.1 | 7.9 | 5.72 |
| Thickening Time @ 80° F. (mins) | — | — | — |
| Thickening Time @ 90° F. (mins) | 11 | — | — |
| Shear Strength (lb/100 ft$^2$) | 3,900 | 4,300 | 2,700 |
| Thermal Conductivity (BTU/hr · ft · ° F.) | 0.125 | 0.115 | 0.072 |

Table 3 contains data for 2 grouting compositions containing different hydrocarbon liquids as the base fluid. For Table 3, in composition 1, PFE is the base fluid and in composition 2, ESCAID 110™ is the base fluid. As can be seen in Table 3, both compositions have similar thermal conductivities. However, the shear strength for composition 2 is lower than composition 1.

TABLE 3

|  | 1 | 2 |
|---|---|---|
| Base Fluid | PFE | ESCAID 110 |
| OMC 2 (gal/100 gal) | 0.75 | 1.0 |
| GELTONE V (lb/100 gal) | 289 | 289 |
| Diatomaceous Earth (lb/100 gal) | 98 | 98 |
| Insulating Material-SPHERELITE (lb/100 gal) | 417 | 417 |
| Density (lb/gal) | 8 | 7.6 |
| Thickening Time @ 80° F. (mins) | 140 | — |
| Thickening Time @ 90° F. (mins) | 9 | — |
| Shear Strength (lb/100 ft$^2$) | 4,400 | 2,800 |
| Thermal Conductivity (BTU/hr · ft · ° F.) | 0.119 | 0.115 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more of the element that it introduces. If there is any conflict in the usages of a word or term in this specification and one or more patent(s) or other documents that may be incorporated herein by reference, the definitions that are consistent with this specification should be adopted.

What is claimed is:

1. A grouting composition for use in insulating a portion of a tubular located inside an enclosed conduit, the grouting composition comprising:
   (A) an oil-swellable binding material comprising an organophilic clay; and
   (B) a hydrocarbon liquid, wherein the hydrocarbon liquid is the continuous phase of the grouting composition; and
   (C) an insulating material comprising hollow microspheres;
   wherein the binding material is in a concentration in the range of about 200 to about 400 pounds per 100 gallons of the hydrocarbon liquid;
   wherein after the grouting composition has set, the grouting composition has a thermal conductivity of less than 0.3 BTU/hr·ft·° F; and
   wherein the grouting composition has a shear strength of at least 2,000, lb/100 ft$^2$ when tested at 24 hours at a temperature of 71° F. and a pressure of 1 atmosphere.

2. The grouting composition according to claim 1, wherein the binding material consists essentially of an organophilic clay.

3. The grouting composition according to claim 1, wherein the hydrocarbon liquid is selected from the group consisting of: a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon, and any combination thereof.

4. The grouting composition according to claim 1, wherein the insulating material consists essentially of hollow microspheres.

5. The grouting composition according to claim 4, wherein the hollow microsphere is made from a mixture of fly ash and crystalline silica, a mixture of soda lime borosilicate glass and silica gel, or a polymer.

6. The grouting composition according to claim 4, wherein the insulating material has a particle size distribution such that at least 90% of the insulating material has a particle size of less than 10 mesh.

7. The grouting composition according to claim 4, wherein the insulating material is in at least a sufficient concentration such that after setting the grouting composition has a thermal conductivity of less than 0.3 BTU/hr·ft·° F.

8. The grouting composition according to claim 4, wherein the insulating material is in at least a sufficient concentration such that after setting the grouting composition has a thermal conductivity of less than 0.2 BTU/hr·ft·° F.

9. The grouting composition according to claim 4, wherein the insulating material is in a concentration of at least 50 pounds per 100 gallons of hydrocarbon liquid.

10. The grouting composition according to claim 4, wherein the insulating material is in a concentration in the range of about 100 to about 500 pounds per 100 gallons of hydrocarbon liquid.

11. The grouting composition according to claim 1, wherein the grouting composition has a thickening time of at least 100 minutes at a temperature of 80° F. and a pressure of 1 atmosphere.

12. The grouting composition according to claim 1, wherein after setting the grouting composition has a thermal conductivity of less than 0.2 BTU/hr·ft·° F.

13. The grouting composition according to claim 1, wherein after setting the grouting composition has a thermal conductivity of less than 0.15 BTU/hr·ft·° F.

14. The grouting composition to claim 1, wherein the grouting composition has a density in the range of about 8 to about 12 pounds per gallon.

15. The grouting composition according to claim 1, wherein the grouting composition further comprises at least one additive.

16. The grouting composition according to claim 15, wherein the at least one additive is selected from the group consisting of: cement, a high-density additive, a dispersant, a filler, a strength-retrogression additive, a set accelerator, a set retarder, a mechanical property enhancing additive, a lost-circulation material, a filtration-control additive, a fluid loss control additive, a defoaming agent, a thixotropic additive, and a nano-particle.

17. The grouting composition to claim 1, wherein the grouting composition has a thickening time of at least 10 minutes at the temperature and pressure of the annulus.

18. The grouting composition according to claim 1, wherein the grouting composition sets in less than 48 hours.

19. The grouting composition according to claim 1, wherein the hydrocarbon liquid comprises a fatty acid ester.

* * * * *